United States Patent [19]

Shimamune et al.

[11] Patent Number: 5,203,972
[45] Date of Patent: Apr. 20, 1993

[54] METHOD FOR ELECTROLYTIC OZONE GENERATION AND APPARATUS THEREFOR

[75] Inventors: Takayuki Shimamune, Tokyo; Isao Sawamoto; Yoshinori Nishiki, both of Kanagawa, all of Japan

[73] Assignee: Permelec Electrode Ltd., Kanagawa, Japan

[21] Appl. No.: 798,645

[22] Filed: Nov. 26, 1991

[30] Foreign Application Priority Data

Nov. 27, 1990 [JP] Japan .................................. 2-323471

[51] Int. Cl.$^5$ ................................................ C25B 1/10
[52] U.S. Cl. ..................................... 204/129; 204/263; 204/266
[58] Field of Search ............... 204/129, 252, 263, 257, 204/266

[56] References Cited

U.S. PATENT DOCUMENTS

| | | | |
|---|---|---|---|
| 4,384,941 | 5/1983 | Okamoto et al. | 204/129 |
| 4,969,981 | 11/1990 | Rogers et al. | 204/263 |
| 4,975,171 | 12/1990 | Nishiki et al. | 204/129 |
| 5,114,549 | 5/1992 | Shimamune et al. | 204/263 |

FOREIGN PATENT DOCUMENTS 0244565 11/1987 Fed. Rep. of Germany .

Primary Examiner—John Niebling
Assistant Examiner—Brian M. Bolam
Attorney, Agent, or Firm—Sughrue, Mion, Zinn, Macpeak & Seas

[57] ABSTRACT

A method and apparatus for electrolytic ozone generation are described which process comprises feeding raw water to an ozone-generating electrolytic cell partitioned into an anode chamber and a cathode chamber by means of a solid electrolyte, said feeding of raw water being only to the cathode chamber, and conducting electrolysis to thereby produce ozone in the anode chamber.

9 Claims, 1 Drawing Sheet

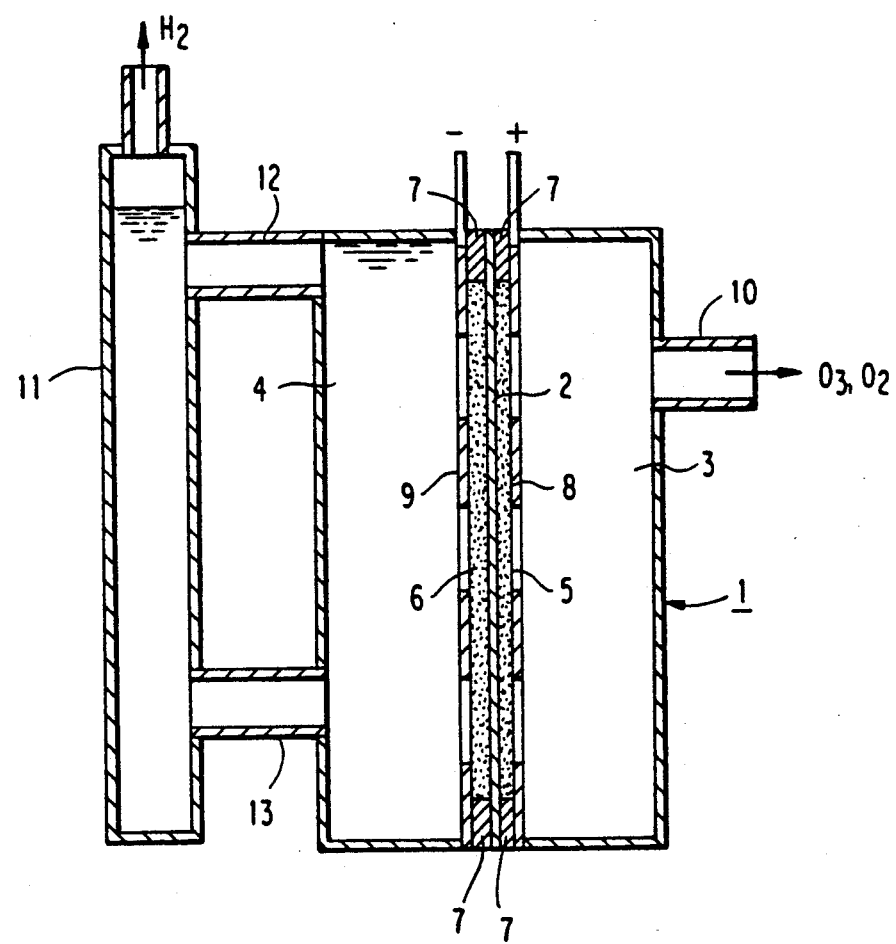

METHOD FOR ELECTROLYTIC OZONE GENERATION AND APPARATUS THEREFOR

FIELD OF THE INVENTION

The present invention relates to a method of ozone generation through water electrolysis and an apparatus therefor. More particularly, the invention relates to a method and apparatus for producing ozone gas for use in the treatment of swimming-pool water, wafer treatment in semiconductor production processes, or chemical reactions. The method and apparatus produce a high current efficiency and high ozone concentration without conducting gas-liquid separation for ozone gas isolation.

BACKGROUND OF THE INVENTION

Ozone, as a powerful and clean oxidizing agent or germicide, is coming to attract attention. The use of ozone particularly for water treatment is increasing since treatment with ozone is advantageous. For example, since the product of ozone decomposition is oxygen, ozone-treated water is not caused to contain any residual substance (unlike the conventional chlorine-treated water). Further, the decomposition rate of ozone is so high that ozone itself does not remain in the treated water and, hence, there are no problems of secondary pollution.

For producing ozone which is a useful oxidizing agent as described above, electrical discharge methods and electrolytic methods have mainly been employed conventionally. The electrical discharge method has the advantages of a small energy unit requiring a low running cost. However, the disadvantages of this method are that the attainable ozone concentration is low, the ozone gas produced contains a large amount of impurities and the equipment tends to be large-scale. On the other hand, the electrolytic method has the disadvantage of a large energy unit, but has the advantage of being able to obtain a high-concentration of high-purity ozone gas through use of a small-sized electrolytic cell. At present, therefore, the electrolytic method is mostly employed because of the advantages of product purity and easiness of operations, although its energy unit is large.

In the electrolytic method, an electrolytic ozone generator (electrolytic ozonizer), employing as the anode a lead oxide-based electrode performing an excellent ozone-evolving function, is used; and, due to such an ozonizer, ozone can be obtained at a high concentration by conducting almost the same operation as that in ordinary water electrolysis. In this electrolytic ozone generator, pure water (ion-exchanged water) is used as the raw material and a perfluorocarbon sulfonic acid-based ion-exchange membrane is mainly used as a solid electrolyte, in combination with lead dioxide as the anode, to generate ozone. By this method, oxygen containing ozone gas at a concentration of about 15% can be obtained. The thus-produced ozone-containing oxygen may be used as it is or after being dissolved in water to give ozone-containing water. Since the ozone generator used in this electrolytic method has a simple structure and its operation is easy as described above, attention is now focused on this apparatus, which among small-sized ozonizers producing small amounts of ozone, is regarded as an ozone generator that generates ozone at a high concentration.

However, this ozone generator, although exhibiting excellent performance, has some drawbacks. The electrolytic cell of this apparatus normally employs a cation-exchange membrane as a solid electrolyte on which an anode and a cathode are tightly disposed, and pure water or ion-exchanged water is fed as raw water to the anode chamber side where ozone is evolved. In this apparatus, ozone and oxygen are evolved in the anode chamber and hydrogen ions, and other cations migrate, together with accompanying water, through the solid electrolyte to the cathode chamber, with hydrogen being evolved in the cathode. In this apparatus, all the cations generated in the anode chamber migrate through the solid electrolyte to the cathode chamber, whereas anions accumulate in the anode chamber because they are unable to pass through the solid electrolyte. Due to the accumulation of anions, the electrical conductance of the anolyte in the anode chamber increases and the current efficiency decreases.

Although the accumulated anions may be removed from the anolyte by circulating the anolyte to the outside of the cell and treating it, for example, with an ion-exchange resin, this treating method is difficult to adopt because the ion-exchange resin used is deteriorated by ozone contained in the anolyte being treated. For this reason, anolyte blowing is the only practical way to remove the accumulated anions. However, the anolyte blowing is disadvantageous in that the apparatus necessarily has an intricate structure. The anolyte blown off should be subjected to ozone decomposition treatment, etc., and the amount of the pure water or ion-exchanged water fed as raw water should be increased.

SUMMARY OF THE INVENTION

An object of the present invention is to provide a method for generating ozone at a high current efficiency and high ozone concentration without the necessity of removing accumulated ions from the anolyte.

Another object of the present invention is to provide an apparatus for use in practicing the above method.

The present invention provides, in the first embodiment thereof, a method for electrolytic ozone generation which comprises feeding raw water to an ozone-generating electrolytic cell partitioned into an anode chamber and a cathode chamber by means of a solid electrolyte, the feeding of raw water being only to the cathode chamber, and conducting electrolysis to thereby produce ozone in the anode chamber.

The present invention further provides, in a second embodiment thereof, an electrolytic ozone generator which comprises an ozone-generating electrolytic cell partitioned with a solid electrolyte into a cathode chamber and an anode chamber, the cathode chamber being connected to a gas-liquid separating column and being filled with raw water, and the anode chamber containing substantially no water other than raw water which has permeated the solid electrolyte from the cathode chamber.

BRIEF DESCRIPTION OF THE DRAWING

The accompanying drawing is a diagrammatic vertical sectional view of one embodiment of the ozone generator according to the present invention.

DETAILED DESCRIPTION OF THE INVENTION

The method of ozone generation and the apparatus therefor according to the present invention are characterized in that raw water is fed to the cathode chamber only in order to eliminate various disadvantages associated with the use of an anolyte in electrolytic ozone generation, such as the gas-liquid separation for separating the anolyte and ozone, the deterioration of the ion-exchange resin in removal of accumulated ions due to the ozone present in the anolyte, and the decrease of current efficiency due to the accumulated ions.

The electrolytic cell employed in the present invention has a structure of the type in which an ion-exchange membrane, preferably a perfluorocarbon sulfonic acid-based ion-exchange membrane, is used as a solid electrolyte (so-called SPE type). This ion-exchange membrane is covered on one side with an anode material and on the other side with a cathode material. It is preferred that the ion-exchange membrane is a cation-permeable membrane because this type of membrane will allow anions generated in the cathode chamber to permeate the membrane and enter the anode chamber. This will prevent the inhibition of ozone-generating reaction on the anode surface by the anions.

The material for the anode chamber in the electrolytic cell is not particularly limited as long as it possesses ozone resistance. For example, titanium, Teflon®, or the like may be used. As the material for the cathode chamber, titanium, stainless steel, Teflon, poly(vinyl chloride), polypropylene, or the like may be used.

The anode material and cathode material covering respective sides of the above-described ion-exchange membrane are not particularly limited. For example, the anode material may be $\beta$-lead dioxide or the like, and the cathode material may be a plantinum group metal or an oxide thereof. In the case where $\beta$-lead dioxide is used as the anode material, it is desirable that a titanium substrate having micropores is first covered with a prime coat of, for example, platinum, gold, etc., and a layer of $\beta$-lead dioxide is then formed thereon by electrodeposition. In the case where platinum, ruthenium oxide, or the like is used as the cathode material, it is desirable that a substrate made of titanium, stainless steel, or carbon and having micropores is coated with a paste prepared by kneading a powder of platinum or other desired cathode material with a binder. Next, the coated substrate is subjected to hot-press shaping.

In place of covering substrates with electrode materials as described above, an electrolytic cell may be constructed by a method in which each electrode material is prepared separately from the ion-exchange membrane. The electrode materials and the ion-exchange membrane are superposed in the order of anode material/ion-exchange membrane/cathode material. After being sandwiched between feeder materials, the superposed structure is then bolted together.

Preferred electrolysis conditions include a current density of about 50–150 A/dm$^2$, cell voltage of about 3.0–3.5 V, and liquid temperature of about 25°–35° C. It should be noted that there are cases where, according to the current quantity, the temperature rises too high due to heat generated by the electrolysis. It is preferable in such a case to lower the temperature by means of cooling water.

It is preferable that the raw water to be fed to the cathode chamber of the electrolytic cell is deionized beforehand in order to protect the ion-exchange membrane.

Upon feeding of raw water to only the cathode chamber of the electrolytic cell and application of electricity between both electrodes, hydrogen gas is evolved in the cathode chamber by ordinary water electrolysis, and, at the same time, part of the raw water in the cathode chamber permeates the cathode material and the solid electrolyte to reach the anode chamber. The raw water which reaches the anode chamber is then electrolyzed on the anode surface to generate ozone and oxygen.

Since substantially no liquid phase is present in the anode chamber, the generated gaseous mixture can be removed as is from the cell. Therefore, there is no need for providing the anode chamber with a gas-liquid separating column as in the conventional apparatus, and, hence, ozone loss and ozone concentration decrease both attributable to gas-liquid separation, etc., can be avoided and high-concentration ozone gas can be produced.

Further, the decrease in current efficiency and increase in anolyte electrical conductivity (due to the inclusion of impurities in the anolyte which are associated with conventional electrolytic ozone generators), never occur in the electrolytic ozone generation according to the present invention. Therefore, if selection of the solid electrolyte and other procedures are conducted properly, an improved ozone-generating efficiency can be attained, which is higher by 20 to 50% than that for the conventional method in which raw water is fed to the anode chamber. In addition, the method of the present invention alleviates the need to treat the anolyte with an ion-exchange resin, etc., which treatment has been necessary so far.

The current efficiency of ozone generation depends greatly on the solid electrolyte. In the case where the solid electrolyte has an ion-exchange capacity of from 0.5 to 5 meq/g and a membrane thickness of from 0.03 to 0.3 mm and ion cluster diameters are regulated in the range of from 10 to 100 Å, the current efficiency can be maintained in the range of from 15 to 25% when the current density is from 10 to 200 A/dm$^2$ (which is the current density range extensively used from a practical viewpoint).

As described above, use of high-purity raw water, i.e., pure water or ion-exchanged water, is preferable in the electrolytic production of ozone and such raw water is relatively expensive. In the present invention, the amount of raw water consumed in the whole process is almost equal in theory to the amount of raw water consumed by the electrolysis itself; hence, there is no need to waste the costly raw water.

Moreover, since substantially no liquid phase is present on the anode chamber side, deterioration of the electrode material due to leakage current can be avoided, and, further, if the anode material has insufficient resistance to inverse current, it is also possible to minimize the protective current.

The electrolytic ozone generator of the present invention is explained below in more detail by reference to one embodiment of the ozone generator (which embodiment is shown in the accompanying drawing), but this embodiment should not be construed as limiting the scope of the invention.

A box-shaped, ozone-generating electrolytic cell 1 is partitioned into an anode chamber 3 and a cathode chamber 4 by means of a solid electrolyte 2 constituted by an ion-exchange membrane. The solid electrolyte 2 is covered on its anode chamber 3 side with an anode material layer 5 which, for example, is a lead dioxide powder and on its cathode chamber 4 side with a cathode material layer 6 which, for example, is platinum, with each of the anode material layer 5 and the cathode material layer 6 being surrounded with a picture frame-shaped gasket 7. A net-form anode feeder element 8 is connected to the side surface of the anode material layer 5, while a net-form cathode feeder element 9 is connected to the side surface of the cathode material layer 6.

In the side wall of the anode chamber 3, a withdrawal opening 10 for generated ozone-containing gas has been formed.

Beside the cathode chamber 4, a gas-liquid separating column 11 is disposed. The cathode chamber 4 and the gas-liquid separating column 11 are connected with each other at their upper parts by a hydrogen withdrawal opening 12 and at their lower parts by a raw water feed opening 13.

In practicing ozone generation using the ozone generator having the above-described construction, raw water such as pure water, ion-exchanged water, or the like is fed only to the inside of the cathode chamber 4 through the raw water feed opening 13. Electricity is then applied, through both feeder elements 8 and 9, to the anode material layer 5 (which functions as the anode) and to the cathode material layer 6 (which functions as the cathode) while the inside of the anode chamber 3 is kept free of a liquid phase. Preferably, the anode chamber 3 is kept in a gas-phase state formed by replacing the inside air with ozone or oxygen.

Hydrogen gas is evolved on the surface of the cathode material layer 6 by the electrolysis of the raw water. The hydrogen gas (which is in the form of a gas-liquid mixture) is led as it is through the hydrogen withdrawal opening 12 to the gas-liquid separating column 11 where the gas is separated from the water. The separated hydrogen gas is then taken out through the upper part of the separating column 11. The raw water left as a result of the gas-liquid separation is introduced again into the cathode chamber 4 through the raw water feed opening 13 and the electrolysis is continued.

Part of the raw water (electrolyte) in the cathode chamber 4 permeates first the cathode material layer 6 and then the solid electrolyte 1 to reach the anode material layer 5, where it is electrolytically oxidized by means of an anodization reaction to generate a gaseous mixture of ozone and oxygen. Since no liquid phase is present in the anode chamber 3, this gaseous mixture never achieves a gas-liquid mixture state (unlike the gaseous mixtures produced in ordinary electrolytic cells) and, hence, it can be taken out through the withdrawal opening 10 without conducting gas-liquid separation.

As described above, since an anolyte is not present in the electrolytic cell 1 shown in the drawing, the separation of a gaseous mixture of ozone and oxygen from anolyte, which has been a requisite operation to the conventional ozone-producing electrolytic cells and the treatment for removing anions and impurities accumulated in conventional anolytes, is unnecessary for the ozone generation according to the present invention. Further, the electrolytic ozone production according to the present invention is free from the conventional problem that the anolyte electrical conductance increases and the current efficiency decreases due to anions and impurities present in the anolyte.

As the electrolysis proceeds, the amount of the raw water (electrolyte) in the cathode chamber reduces. However, by supplying the gas-liquid separating column 11 with raw water in only an amount equal to the reduced amount, the electrolysis can be continued. Thus, there is no need to supply a large quantity of raw water (as in the conventional ozone-generating electrolytic cells).

The method of electrolytic ozone generation according to the present invention, which comprises feeding raw water to an ozone-generating electrolytic cell partitioned into an anode chamber and a cathode chamber by means of a solid electrolyte and conducting electrolysis thereby to produce ozone in the anode chamber and which is characterized in that the feeding of raw water is conducted to the cathode chamber, brings about the following effects.

Since substantially no liquid phase is present in the anode chamber, the generated gaseous mixture can be taken out as it is from the cell. Therefore, there is no need to provide the anode chamber with a gas-liquid separating column as in the conventional apparatus. Since, the ozone loss and ozone concentration decrease are both attributable to gas-liquid separation, high-concentration ozone gas can be produced.

Further, the decrease in current efficiency and increase in anolyte electrical conductivity due to the inclusion of impurities in anolyte, which are associated with conventional electrolytic ozone generators, never occur in the electrolytic ozone generation according to the present invention. Therefore, if selection of the solid electrolyte and other procedures are conducted properly, an improved ozone-generating efficiency can be attained which is higher by 20 to 50% than that for the conventional method in which raw water is fed to the anode chamber. In addition, the method of the present invention does not require the conventionally required treatment of anolyte with an ion-exchange resin, etc.

Moreover, in the method of the present invention, the amount of raw water consumed in the whole process is almost equal in theory to the amount of raw water consumed by the electrolysis itself and, hence, there is no need to waste the costly raw water.

Furthermore, since substantially no liquid phase is present on the anode chamber side, deterioration of the electrode material due to leakage current can be avoided and; further, if the anode material has insufficient resistance to inverse current, it is also possible to minimize the protective current.

The ozone generator according to the present invention, which comprises an ozone-generating electrolytic cell partitioned with a solid electrolyte into a cathode chamber and an anode chamber, and which is further characterized in that the cathode chamber is connected to a gas-liquid separating column and filled with raw water and the anode chamber contains substantially no raw water other than the raw water that has permeated the solid electrolyte from the cathode chamber, eliminates the necessity of gas-liquid separation and attains a heightened current efficiency etc., like the method of the present invention described above. Accordingly, the ozone generator has improved operation properties and can attain a considerable cost reduction in ozone production.

The present invention is further explained below with reference to the following examples in which ozone generation is conducted using ozone generators according to the present invention. However, these examples should not be construed as limiting the scope of the invention.

EXAMPLE 1

According to the accompanying drawing, an ozone generator was constructed as follows.

Using a perflurosulfonic acid membrane (Nafion ® 117, a product of Du Pont) having a length of 10 cm, a width of 10 cm, a thickness of 0.18 mm, and an ion-exchange capacity of 0.9 meq/g as a solid electrolyte, an electrolytic cell having an electrode area of 1 dm$^2$, an anode chamber capacity of 100 cm$^3$, and a cathode chamber capacity of 800 cm$^3$ was constructed, with the anode material being β-lead dioxide and the cathode material being platinum. The anode material was connected with an anode feeder element which was a net-form sintered body obtained by sintering titanium fine fibers, while the cathode material was connected with a cathode feeder element which was a net-form sintered body obtained by sintering stainless-steel fine fibers. Beside the cathode chamber, a gas-liquid separating column was disposed in which ion-exchanged water prepared through deionization with an ion-exchange resin was stored as raw water. For feeding the raw water to the cathode chamber and circulating the water, a pump was used.

By supplying an electric current of 50 A (current density 50 A/dm$^2$) to the electrolytic cell, electrolysis was continued for 24 hours. As a result, the current efficiency of ozone generation in this period was 13% on the average.

The reduced amount of the raw water in the cathode chamber was 0.4 liter, which was almost equal to the amount consumed by the electrolysis.

EXAMPLE 2

Ozone generation was conducted under the same conditions as in Example 1 except that the quantity of supplied electric current was changed to 100 A (current density 100 A/dm$^2$). As a result, the current efficiency of ozone generation was 15% on the average.

EXAMPLE 3

Ozone generation was conducted under the same conditions as in Example 2, except that the thickness of the solid electrolyte was changed to 0.09 mm. As a result, the current efficiency of ozone generation was raised to 16% on the average.

EXAMPLE 4

Ozone generation was conducted under the same conditions as in Example 1, except that the ion-exchange capacity of the solid electrolyte was changed to 1.1 meq/g. As a result, the current efficiency of ozone generation was 15% on the average.

COMPARATIVE EXAMPLE 1

Electrolysis was conducted for 24 hours under the same conditions as in Example 1, except that the anode chamber was also filled with the same raw water as that fed to the cathode chamber. As a result, the current efficiency of ozone generation in this period was 12% on the average, and the electrical conductance of the raw water (electrolyte) increased from 2 μS/cm to 25 μS/cm. Further, the reduced amount of the raw water in the anode chamber and cathode chamber was 2.5 liters, which was about 6 times the amount of the raw water reduced in the cathode chamber in Example 1.

While the invention has been described in detail and with reference to specific embodiments thereof, it will be apparent to one skilled in the art that various changes and modifications can be made therein without departing from the spirit and scope thereof.

What is claimed is:

1. A method for electrolytic ozone generation which comprises feeding raw water to an ozone-generating electrolytic cell partitioned into an anode chamber and a cathode chamber by means of a solid electrolyte, said feeding of raw water being only to the cathode chamber, and conducting electrolysis to thereby produce ozone in the anode chamber.

2. A method for electrolytic ozone generation as in claim 1, wherein the solid electrolyte is a cation permeable ion exchange membrane.

3. A method for electrolytic ozone generation as in claim 2, wherein the ion exchange membrane is a perfluorocarbonsulfonic acid-based ion exchange membrane.

4. A method for electrolytic ozone generation as in claim 2, wherein the anode chamber is ozone resistant.

5. A method for electrolytic ozone generation as in claim 1, wherein the electrolysis conditions comprise a current density of approximately 50-150 A/dm$^2$, cell voltage of about 3.0-3.5 V, and liquid temperature of about 25°-35° C.

6. A method for electrolytic ozone generation as in claim 1, wherein raw water is deionized before it is fed into the cathode chamber.

7. An electrolytic ozone generator which comprises an ozone generating electrolytic cell partitioned by a solid electrolyte into a cathode chamber and an anode chamber, said cathode chamber being connected to a gas liquid separating column, and a raw water feed opening is provided and is connected only to said cathode chamber.

8. An electrolytic ozone generator as in claim 7, wherein the solid electrolyte is an ion exchange membrane of the perfluorcarbonsulfonic acid type.

9. An electrolytic ozone generator as in claim 7, wherein the cathode chamber and the gas liquid separating column are connected with each other at their upper parts by a hydrogen withdrawal opening and at their lower parts by a raw water feed opening.

* * * * *